No. 766,987. PATENTED AUG. 9, 1904.
W. A. BUNNELL.
PHOTOGRAPHIC GALLERY APPLIANCE.
APPLICATION FILED FEB. 2, 1904.
NO MODEL.

No. 766,987. Patented August 9, 1904.

UNITED STATES PATENT OFFICE.

WALTER A. BUNNELL, OF DECATUR, TEXAS.

PHOTOGRAPH-GALLERY APPLIANCE.

SPECIFICATION forming part of Letters Patent No. 766,987, dated August 9, 1904.

Application filed February 2, 1904. Serial No. 191,699. (No model.)

*To all whom it may concern:*

Be it known that I, WALTER A. BUNNELL, a citizen of the United States, residing at Decatur, in the county of Wise and State of Texas, have invented a new and useful Photograph-Gallery Appliance, of which the following is a specification.

This invention is an appliance for the use of photographers, the object being to provide a device by means of which a photograph and the mount can be made at one and the same time ready to be pasted to an ordinary card, thereby avoiding the necessity of employing a special card-mount to paste the photograph on.

At the present time photographers employ card-mounts bearing imprints of their name or trade-mark, and as these mounts are expensive it adds considerable to the cost of a photograph, and in small photographs, commonly known as "penny-pictures," mounts are never employed, because their use would be too expensive. By means of my invention the mount is made at the same time as the photograph, and the same effect is produced as though a separate mount were employed. This object is attained by employing an open frame of a shape to correspond with the mount desired, which frame bears the photographer's imprint, which may be his name or trade-mark, or the frame may have any other marks or matter arranged thereon; and the invention consists also in the manner of supporting said frame and in certain details of construction hereinafter fully described, and pointed out in the claims.

Figure 1:
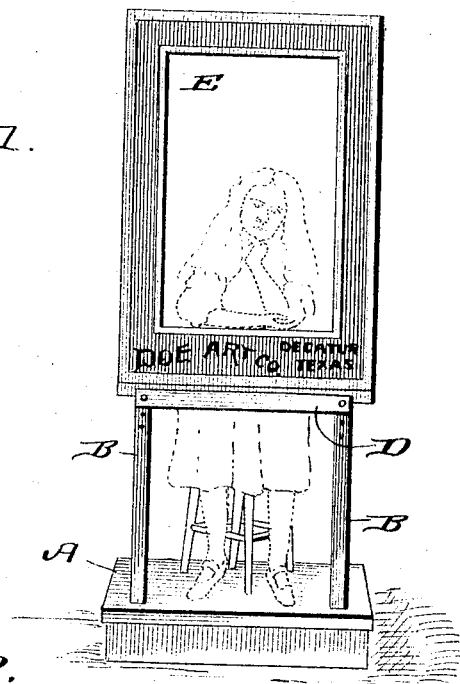
Figure 2:
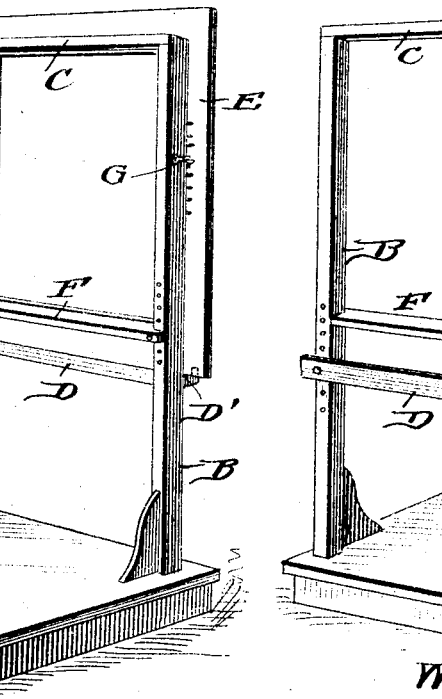
Figure 3:
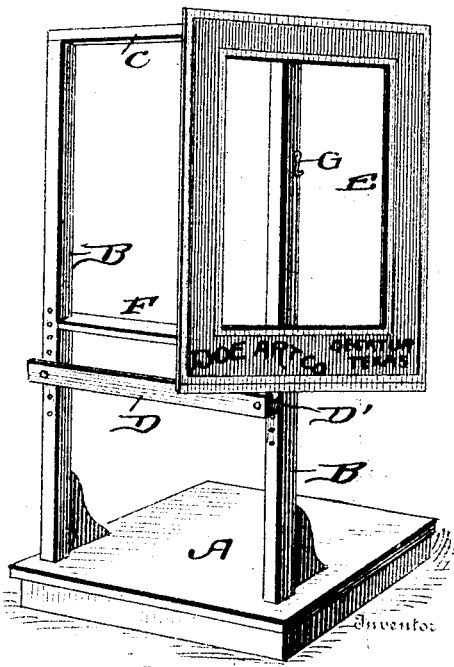

In the drawings forming a part of this specification, Figure 1 is a view showing the practical application of my invention. Fig. 2 is a perspective view of the device, taken from the rear; and Fig. 3 is a view showing frame removed from the rack.

In constructing a device in accordance with my invention I employ a base or platform A, upon which are mounted the uprights B B, of any desired height and connected at their upper ends by means of the top piece C. A rest-piece D is connected to the uprights B, said rest-piece being grooved, as shown at D', for the purpose of receiving the bottom edge of the open frame E, which is shaped to correspond with the mount desired—that is, it may be square, oblong, round, or oval, and it may be broad or narrow, as preferred, and bears the imprint of the photographer, preferably at the bottom. The person to be photographed stands or sits upon the platform back of the frame, so that the portion of the body to be photographed is exposed through the opening in the frame, and when the photograph is taken the frame, with the imprint, is photographed also, and when the photograph is finished and pasted upon an ordinary card it has the appearance of a photograph mounted upon a special card-mount, as the photograph is surrounded by a mat-like representation which bears the imprint of the photographer. This photograph can be finished for a small sum and which will have the same appearance as an expensive photograph.

The rest-piece D is preferably adjustable, and an arm-rest F may be attached to the uprights upon the inner side and upon which a person can rest one or both arms in case it is desired to take a photograph of a person in that position. This arm-rest may also be adjustable. Hooks G may be employed to hold the frame to the rack to prevent the frame falling.

It will thus be seen that I provide a cheap, simple, and efficient photographer's accessory capable of carrying out all of the objects hereinbefore mentioned.

The device is particularly adaptable for use out of doors—for instance, at picnics and fairs, where a number of people have their photographs taken, the advantage of my improvement at such times being apparent, as it is only necessary for the photographer to focus his camera upon the appliance, and one focusing will do for any number of photographs, and it would not be necessary to focus after each sitting, as is now the case.

Having thus fully described my invention, what I claim as new, and desire to secure by Letters Patent, is—

1. A device of the kind described comprising parallel uprights connected permanently adjacent their upper ends, said uprights having a plurality of perforations formed therein, a grooved rest-piece having perforations adapted to aline with those of the uprights, and a removable, open frame adapted to rest upon the rest-piece, as and for the purpose set forth.

2. A device of the kind described comprising vertical uprights, a longitudinally-grooved rest-piece, means for adjustably connecting the rest-piece to the uprights, and an open frame adapted to stand vertically upon the rest-piece.

3. A device of the kind described comprising parallel uprights, an arm-rest carried by the said uprights, an adjustable, longitudinally-grooved rest-piece carried by the uprights, and an open frame adapted to be supported by the rest-piece.

4. A device of the kind described comprising a stand, uprights carried thereby, an arm-rest connecting the uprights, an adjustable rest-piece carried by the uprights adjacent the arm-rest, and an open frame adapted to be supported by the rest-piece, as and for the purpose set forth.

WALTER A. BUNNELL.

Witnesses:
STUART MILLER,
ROBERT McC. WALKER.